(12) United States Patent
Eberle

(10) Patent No.: US 9,533,583 B2
(45) Date of Patent: Jan. 3, 2017

(54) CHARGING APPARATUS FOR A MOTOR VEHICLE FOR CHARGING A VEHICLE BATTERY

(71) Applicant: Dr. Ing. h.c.F. Porsche Aktiengesellschaft, Stuttgart (DE)

(72) Inventor: Wilfried Eberle, Ehingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 173 days.

(21) Appl. No.: 13/848,166

(22) Filed: Mar. 21, 2013

(65) Prior Publication Data

US 2013/0249486 A1    Sep. 26, 2013

(30) Foreign Application Priority Data

Mar. 21, 2012    (DE) .................. 10 2012 102 419

(51) Int. Cl.
 *H02J 7/00* (2006.01)
 *B60L 11/18* (2006.01)

(52) U.S. Cl.
 CPC ........ B60L 11/1809 (2013.01); B60L 11/1818 (2013.01); *Y02T 10/7005* (2013.01); *Y02T 10/7072* (2013.01); *Y02T 90/14* (2013.01)

(58) Field of Classification Search
 USPC .................. 320/104, 109; 439/344, 304, 310
 See application file for complete search history.

(56) References Cited

U.S. PATENT DOCUMENTS

| | | | |
|---|---|---|---|
| 5,350,312 A | 9/1994 | Kuno et al. | |
| 2006/0178028 A1* | 8/2006 | Swiatek et al. | 439/215 |
| 2010/0246198 A1* | 9/2010 | Hook et al. | 362/459 |
| 2011/0287667 A1* | 11/2011 | Ichio | 439/660 |
| 2011/0300753 A1 | 12/2011 | Ichikawa et al. | |
| 2013/0078846 A1* | 3/2013 | Sasaki et al. | 439/374 |

FOREIGN PATENT DOCUMENTS

| | | |
|---|---|---|
| CN | 202042692 | 11/2011 |
| CN | 202127139 | 1/2012 |
| DE | 43 43 209 | 7/1984 |
| DE | 10 2011 004 834 | 8/2012 |
| JP | 07029631 | 1/1995 |
| JP | 2006024403 | 1/2006 |
| JP | 2009146711 | 7/2009 |
| JP | 2011249039 | 12/2011 |
| WO | 2011/104609 | 9/2011 |

OTHER PUBLICATIONS

Patent Application No. 2013100870664—Office Action issued Oct. 29, 2014.
German Search Report of Nov. 30, 2012.

* cited by examiner

*Primary Examiner* — Samuel Berhanu
(74) *Attorney, Agent, or Firm* — Gerald E. Hespos; Michael J. Porco; Matthew T. Hespos

(57) ABSTRACT

A charging apparatus (10) for charging a vehicle battery has a charging socket arrangement (12, 112) with a charging socket (15, 115) designed to receive a charging plug connected to a charging cable, and an adapter device (18, 118) for receiving the charging socket (15, 115). The charging apparatus 10 also has a charging cradle (22) for sealing off the charging socket (15, 115) from a body of the motor vehicle, and a reinforcing element (25) designed to receive the charging socket arrangement (12, 112).

9 Claims, 5 Drawing Sheets

CHARGING APPARATUS FOR A MOTOR VEHICLE FOR CHARGING A VEHICLE BATTERY

CROSS REFERENCE TO RELATED APPLICATIONS

This application claims priority under 35 USC 119 to German Patent Appl. No. 10 2012 102 419.7 filed on Mar. 21, 2012, the entire disclosure of which is incorporated herein by reference.

BACKGROUND OF THE INVENTION

1. Field of the Invention

The invention relates to a charging apparatus for a motor vehicle, in particular to a charging apparatus for charging a vehicle battery.

2. Description of the Related Art

Charging apparatuses for charging a vehicle battery for electrically driven vehicles are known and are configured so that a motor vehicle is connected to a stationary power supply system by means of a charging cable. The motor vehicle has a charging socket into for receiving a charging plug of the charging cable. Different countries have different types of charging cables and/or charging plugs, and therefore different types of charging sockets are required. This requires a large number of different structural elements and components, depending on country-specific specifications of the charging apparatus. It is therefore desirable from the manufacturers' point of view to provide a simplified charging apparatus.

Against this background, the object of the invention is to provide an improved and simplified charging apparatus for a motor vehicle for charging a vehicle battery.

SUMMARY OF THE INVENTION

The invention provides a charging apparatus for a motor vehicle for charging a vehicle battery. The vehicle has a charging socket arrangement comprising a charging socket and an adapter. The charging socket is designed to receive a charging plug that is connected to a charging cable. The adapter receives the charging socket. The charging apparatus also has a charging cradle for sealing off the charging socket from a body of the motor vehicle, and a reinforcing element that receives the charging socket arrangement.

The charging socket of the charging socket arrangement can be selected based on country-specific specifications. More particularly, the adapter device is designed to be received by the reinforcing element, irrespective of the charging socket provided. The modular charging socket arrangement leads to simplified assembly, increased flexibility by optionally using one of a large number of different charging socket arrangements depending on requirements, and a simplified charging apparatus that uses a uniform reinforcing element with the plurality of different charging socket arrangements.

The adapter preferably has at least one opening for receiving the charging socket so that the adapter can be matched to the respective charging socket. The opening for receiving the charging socket therefore has a different shape, depending on the charging socket. However, the adapter is of uniform configuration to the extent that it can be received by the reinforcing element irrespective of the charging socket used.

The reinforcing element preferably has at least one opening for receiving the charging socket arrangement. The opening is designed so that the charging socket arrangement overlaps the opening in the reinforcing element. Thus, the adapter of the charging socket arrangement can be supported on the reinforcing element. The adapter therefore functions to position or fasten the charging socket arrangement on the reinforcing element. As a result, the charging socket is arranged in a region of the opening in the reinforcing element when the adapter is supported on the reinforcing element.

The charging socket arrangement preferably is fastened to the reinforcing element by a plurality of fastening elements so that the charging socket arrangement can be fastened securely to the reinforcing element.

The fastening elements may comprise screws and nuts. The screws may be inserted through openings in the reinforcing element and in the adapter and the nuts may be designed to be connected to the screws. Thus, the adapter can be fastened securely to the reinforcing element and released from the reinforcing element.

The screws may be welded to the reinforcing element. Welding the screws to the reinforcing element has the advantage of axially fixing the screws and also has the advantage that the screws are arranged in a rotationally fixed manner. As a result, the adapter can be connected to the reinforcing element in an exact and accurately fitting manner and the screws cannot become detached from the reinforcing element.

An adapter ring may be fastened to the charging socket and may have a connection to the charging cradle. The adapter ring allows the charging cradle to be attached to the charging socket in a simple manner.

The adapter ring may have an adhesive or clamping connection to the charging socket to provide a secure connection to the charging socket.

The charging cradle preferably has a sealing element suitable for connection to the adapter ring. This reliable sealing of the charging apparatus from a body of the motor vehicle is ensured.

The charging cradle preferably is inclined in relation to a horizontal. Thus, water may collect in the charging cradle or the charging socket arranged in the charging cradle. Accordingly, the charging cradle may have an opening for removing water from the charging cradle and/or for the charging socket to have an opening for removing water from the charging socket. The respective opening for removing water from the charging cradle or the charging socket allows water that has collected to run off in a reliable manner.

DETAILED DESCRIPTION OF THE PREFERRED EMBODIMENTS

Figure 1:
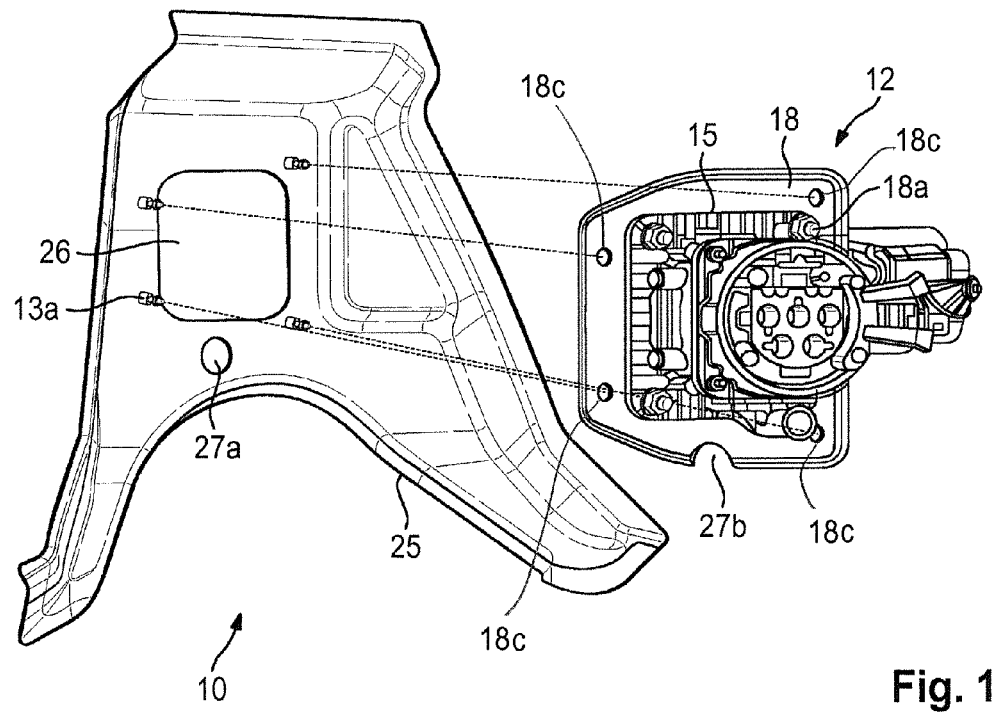
FIG. 1 is a rear perspective view of a charging apparatus according to a first embodiment of the invention.
Figure 2:
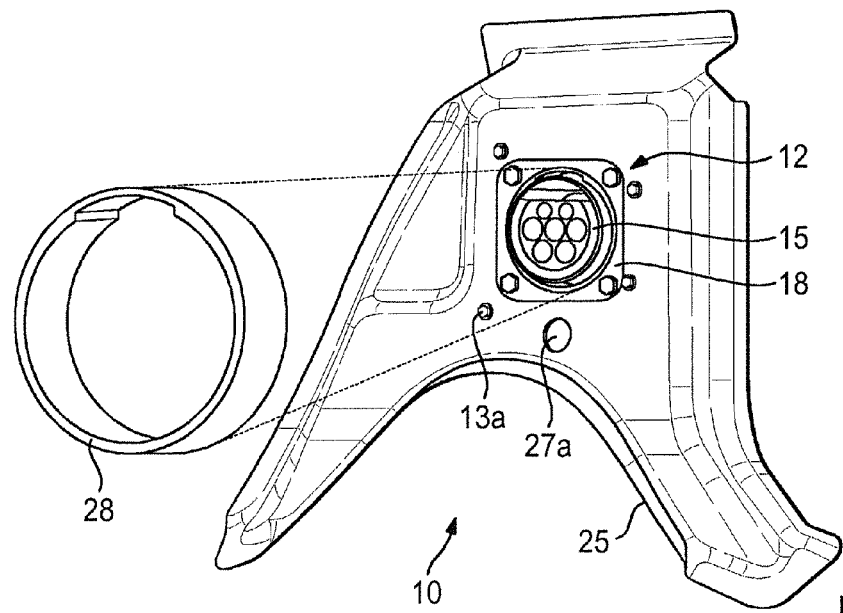
FIG. 2 is a front perspective view of the charging apparatus of FIG. 1.

A charging apparatus 10 for a motor vehicle for charging a vehicle battery according to FIG. 1 has a reinforcing element 25 and a charging socket arrangement 12. FIG. 1 shows a rear face of the reinforcing element 25, which is part of the vehicle body and preferably is a sheet metal part. The reinforcing element 25 has an opening 26, an opening 27a and a total of four screws 13a. The opening 26 has a substantially square shape with rounded corners and is arranged in a central region of the reinforcing element 25. The opening 27a is substantially circular and is arranged in a lower region beneath the opening 26. The screws 13a are arranged substantially adjacent the respective rounded corners of the opening 26 and are inserted in the reinforcing element 25 from a side that is shown in FIG. 2. As a result, a screw head of a respective screw 13a is on the side that is not shown and a threaded screw bolt is on a side of the reinforcing element 25 that is shown. Moreover, the screws 13a are welded to the reinforcing element 25.

Figure 3:
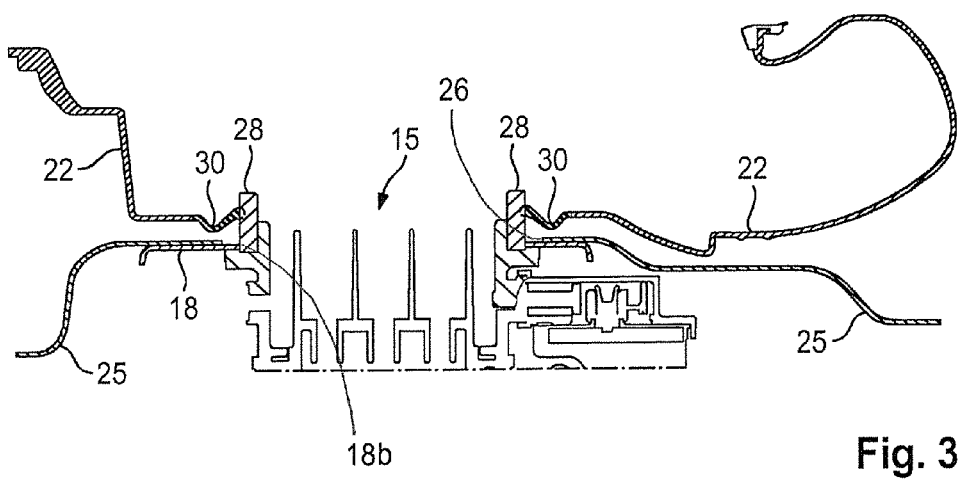
FIG. 3 is a cross-sectional view through the charging apparatus of FIG. 1.

The charging socket arrangement 12 has a charging socket 15 and an adapter device 18. The adapter device 18 has an opening 18b for receiving the charging socket 15, a total of four openings 18c for receiving the screws 13a of the reinforcing element 25, and a cutout 27b. The adapter device 18 is shaped in a substantially rectangular manner with rounded corners, with upper and lower corners on the left side of FIG. 1 being more rounded than those on the right side. The opening 18b is shown in FIG. 3 and is designed for receiving the charging socket 15 in the adapter device 18 in an accurately fitting manner. The charging socket 15 is fastened to the adapter device 18 with a plurality of fastening means 18a, such as pairs of screws/nuts.

The charging socket arrangement 12 is designed to be fastened to the reinforcing element 25. In particular, the adapter device 18 of the charging socket arrangement 12 is fastened to the reinforcing element 25 by inserting the screws 13a, which project from the reinforcing element 25, into the holes formed in the adapter device 18 for receiving the screws 13a, and then fastening the screws using nuts (not shown).

The cutout 27b is formed in a lower region of the adapter device 18 and is congruent with the opening 27a in the reinforcing element 25 when the charging socket arrangement 12 is in the fitted state. The opening 27a and the cutout 27b receive a hose (not shown) for removing water from the charging cradle 22 of the charging apparatus 10.

The charging socket arrangement 12 is fit in the reinforcing element 25, as shown in FIG. 2, so that a front face of the charging socket 15 of the charging socket arrangement 12 is accessible for receiving a charging plug (not shown) of a charging cable. An adapter ring 28 is illustrated in an exploded form and is a substantially circular hollow cylinder with a wall that is thinner in an upper region. The adapter ring 28 has an adhesive or clamping connection to the charging socket 15 and can receive and/or fasten the charging cradle (not shown).

The charging socket 15, the adapter device 18, the reinforcing element 25, the charging cradle 22 are illustrated in FIG. 3. The charging cradle 22 is designed to make contact with an outer face of the vehicle body in an upper region of FIG. 3 and has a sealing element 30 connected to the adapter ring 28 at a lower region of FIG. 3. The adapter ring 28 has a fixed adhesive or clamping connection to the charging socket 15. The sealing element 30 is preferably a rubber part that is injected-molded onto a fixed portion of the charging cradle 22, which portion is preferably formed from plastic. The connection between the charging cradle 22 and the charging socket 15 or the adapter ring 28 therefore is sealed off from environmental influences, for example water.

Figure 4:
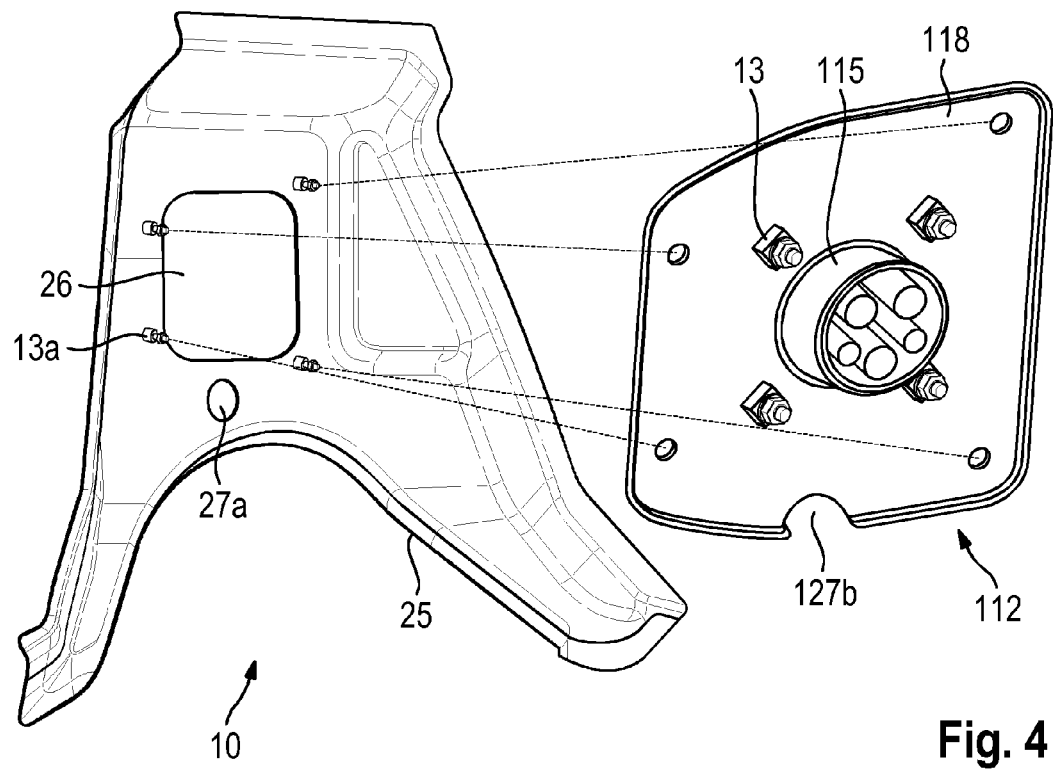
FIG. 4 is a perspective view of a charging apparatus according to a second embodiment of the invention.

The charging apparatus 10 of the second embodiment is illustrated in FIG. 4 and has a charging socket 115 and an adapter device 118 that differ from the corresponding parts of the first embodiment. The adapter device 118 is designed to receive the charging socket 115 in an accurately fitting manner. The charging socket 115 is fastened to the adapter device 118 and the adapter device 118 is fastened to the reinforcing element 25 by a screw/nut arrangement as in the first embodiment.

Figure 5:
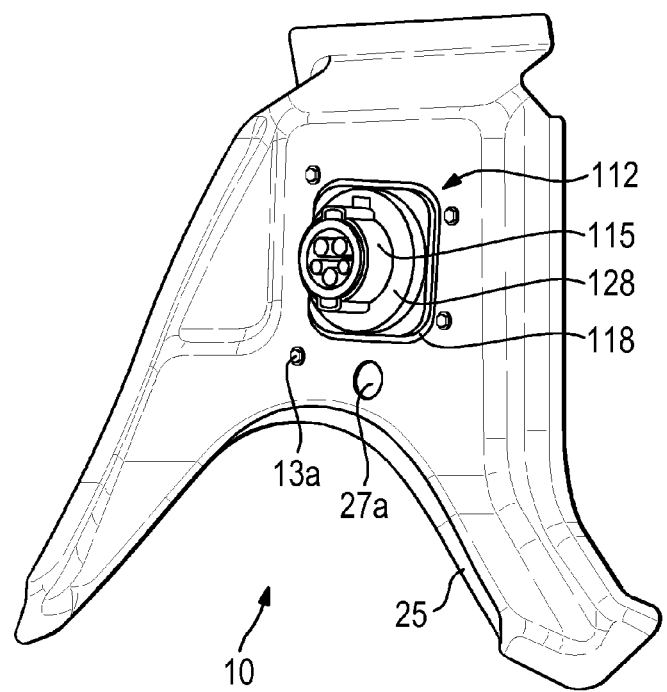
FIG. 5 is a perspective view of the charging apparatus of FIG. 4.

The charging apparatus 10 has a front face that is shown in the perspective view of FIG. 5. An adapter ring 128 is arranged on the charging socket arrangement 112 and has a substantially rectangular shape with rounded corners. The adapter ring 128 is slightly smaller than the cutout in the reinforcing element 25 for receiving the charging socket arrangement 112. In this case, the adapter ring 128 is matched to the shape of the modified charging socket 115.

Figure 6:
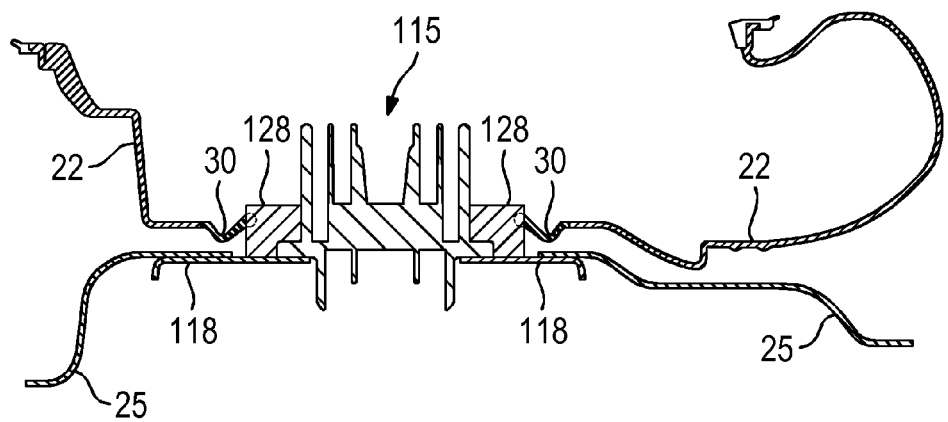
FIG. 6 is a cross-sectional view through the charging apparatus of FIG. 4.

The charging socket 115, the adapter device 118, the reinforcing element 25, the charging cradle 22 are illustrated in the cross section of FIG. 6. The charging cradle 22 is designed to make contact with an outer face of the vehicle body in an upper region of FIG. 6, and also has a sealing element 30 connected to the adapter ring 128, as seen in the lower part of FIG. 6. The adapter ring 128 has a fixed adhesive or clamping connection to the charging socket 115. The sealing element 30 preferably is a rubber part that is injected-molded onto a fixed and preferably plastic portion of the charging cradle 22. The connection between the charging cradle 22 and the charging socket 115 or the adapter ring 128 therefore is sealed off from environmental influences, for example water.

Figure 7:
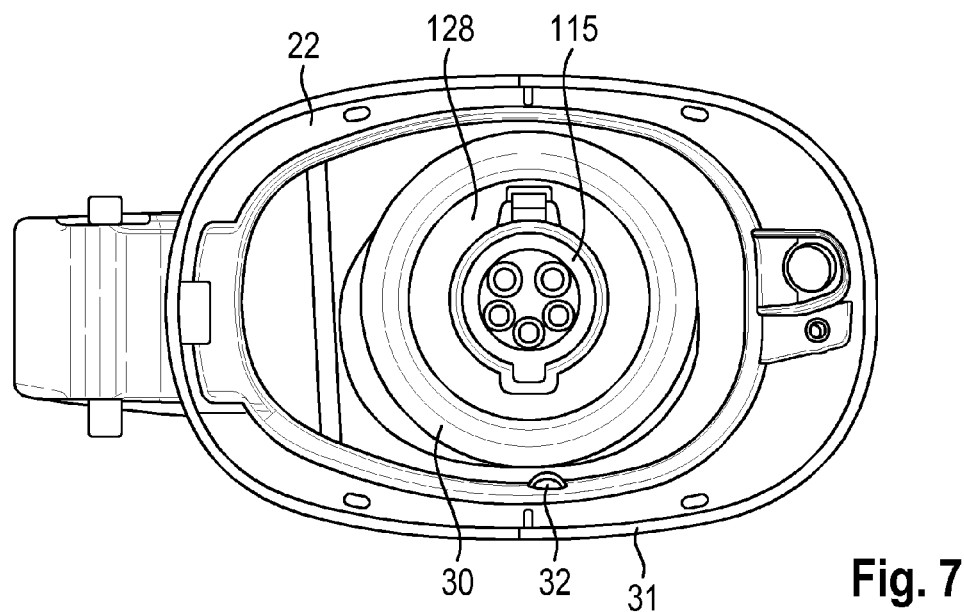
FIG. 7 is a plan view of the charging apparatus of FIG. 4.

A further sealing element 31, as shown in FIG. 7, is formed in an outer peripheral region of the charging cradle 22 in addition to the sealing element 30 that connects the charging cradle 22 to the adapter ring. The sealing element 31 is injection-molded onto a fixed section of the charging cradle 22 and preferably is formed from rubber. The sealing element 31 therefore extends between the charging cradle 22 and a body section (not shown) of the motor vehicle. The sealing elements 30, 31 protect the charging apparatus 10, in particular the charging cradle 22, from environmental influences, such as splashing water or the like. As a result, water that collects in the charging cradle 22 cannot penetrate to a rear face of the charging apparatus 10. Water that may be present in the charging cradle 22 can flow away through the opening 32 for removing water from the charging cradle 22.

Figure 8:
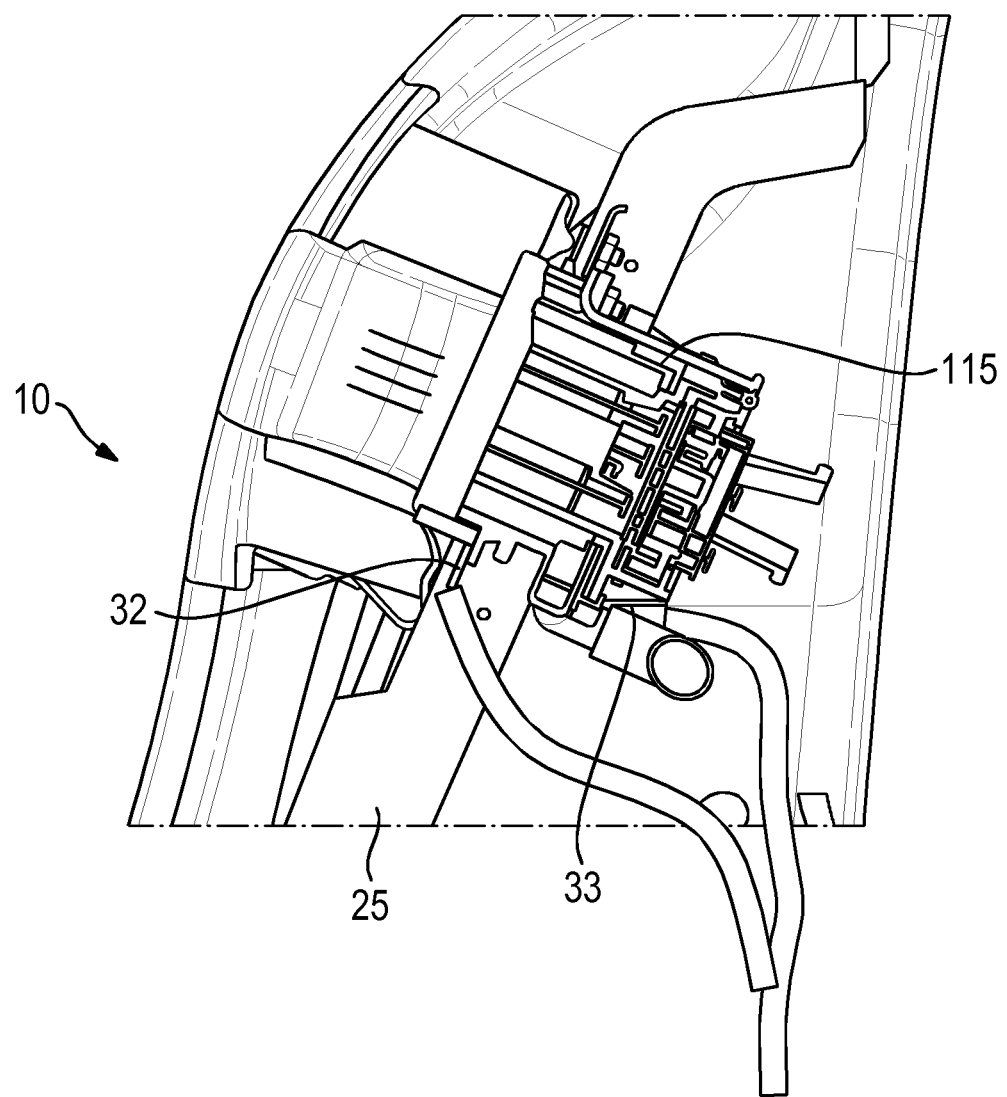
FIG. 8 is a longitudinal sectional view through the charging apparatus of FIGS. 4-7.

The opening 32 in the charging cradle 22 for removing water has a hose, as shown in FIG. 8, so that any water in the charging cradle 22 can flow away through the hose. The charging socket 115 also has an opening 33 for removing water from the charging socket 115. The opening 33 in the charging socket 115 also has a hose so that water that collects in the charging socket 115 can run off through the opening 33 or the hose. The hoses of the openings 32 and 33 issue into a common Y-shaped tubular connection piece so that the water can run off through a common outlet.

What is claimed is:
1. A charging apparatus for a motor vehicle for charging a vehicle battery, the motor vehicle having a vehicle body with an outer panel having an outer panel opening through which the charging apparatus is accessible, the charging apparatus comprising:

a universal reinforcing element defining a part of the vehicle body inward of the outer panel and having a first opening defining an inner peripheral edge;

a charging socket arrangement having:

an adapter with a universal outer attachment region attached to the reinforcing element outward of the first opening and being formed with a country-specific second opening inward of the inner peripheral edge of the first opening and an inner attachment region inward of the outer attachment region and outward of the second opening, and a country-specific charging socket fastened and positioned to the adapter at the inner attachment region so that the charging socket is inward of the inner peripheral edge of the first opening and at least partly aligned with the second opening so that the charging socket can receive a country-specific charging plug that is connected to a charging cable;

a charging cradle having an outer periphery in sealing contact with the outer panel of the motor vehicle at locations in proximity to the outer panel opening and having an inner periphery in sealing contact with the charging socket arrangement.

2. The charging apparatus of claim 1, wherein the charging socket arrangement is fastened to the reinforcing element by a plurality of fastening elements.

3. The charging apparatus of claim 2, wherein the fastening elements are formed by screws and nuts, the screws being inserted through fastening element openings formed in the reinforcing element and the adapter device, and the nuts being configured to be screwed to the screws.

4. The charging apparatus of claim 3, wherein the screws are welded to the reinforcing element.

5. The charging apparatus of claim 1, further comprising an adapter ring fastened to the charging socket and having a connection to the charging cradle.

6. The charging apparatus of claim 5, wherein the adapter ring has an adhesive or clamping connection to the charging socket.

7. The charging apparatus of claim 5, wherein the charging cradle has a sealing element connected to the adapter ring.

8. The charging apparatus of claim 1, wherein the charging cradle and the reinforcing element have congruent openings opening for removing water from the charging cradle and the charging socket has an opening for removing water from the charging socket.

9. The charging apparatus of claim 1, wherein the sealing element is a rubber part that is injection-molded onto a plastic portion of the charging cradle.

* * * * *